Sept. 29, 1936.    K. ENGEL    2,055,483
APPARATUS AND METHOD FOR USE IN THE MANUFACTURE OF SHOES
Filed July 26, 1933    4 Sheets-Sheet 1

Sept. 29, 1936.  K. ENGEL  2,055,483
APPARATUS AND METHOD FOR USE IN THE MANUFACTURE OF SHOES
Filed July 26, 1933  4 Sheets-Sheet 2

Fig. 4.

Sept. 29, 1936.  K. ENGEL  2,055,483

APPARATUS AND METHOD FOR USE IN THE MANUFACTURE OF SHOES

Filed July 26, 1933  4 Sheets-Sheet 3

Patented Sept. 29, 1936

2,055,483

UNITED STATES PATENT OFFICE 2,055,483

APPARATUS AND METHOD FOR USE IN THE MANUFACTURE OF SHOES

Karl Engel, Lynn, Mass., assignor to United Shoe Machinery Corporation, Paterson, N. J., a corporation of New Jersey Application July 26, 1933, Serial No. 682,234

63 Claims. (Cl. 12—14)

This invention relates to methods and apparatus for use in the manufacture of shoes and particularly to methods and apparatus for use in the shaping of upper materials at the toes of shoes and the removal of surplus material therefrom.

When the outer layer of the upper materials is to be secured in lasted position at the toe of a shoe by cement, it is desirable to remove a substantial portion or all of the lasting allowance of the other layers of the upper materials at the toe, to apply cement, for instance, to the bottom of the insole, and then to wipe the lasting allowance of the outer layer over the insole to be secured thereto by cement. Heretofore trimming out of the excess portion of the inner layers of the upper materials, that is, of the toe box, lining and doubler, if present, has been performed entirely by hand, as has also the application of cement to the parts to be secured together.

Objects of this invention are to facilitate the removal of the excess of layers of upper material and the application of cement to the insole, thus expediting the manufacture of shoes the uppers at the toes of which are held in lasted position by cement.

A feature of the invention, in one of its novel aspects, consists in the combination with means for working an upper into lasted position with respect to the toe portion of a last and for holding it against the last adjacent to its edge, of a trimming cutter constructed and arranged to move in a predetermined path substantially parallel to the plane of the insole to remove stock from that portion of the upper materials which projects beyond the edge of the last bottom. As illustrated, end-embracing wipers are utilized for shaping the upper to the last and for holding it against the end and sides of the last, the wipers serving as a support for the portion of the upper materials which extends above the last bottom, generally referred to as the lasting allowance, when the lasting allowance is turned outwardly upon them. In the construction shown a rotary disk cutter is arranged for movement in a plane substantially parallel to the upper face of the wipers, and means acting in advance of the cutter and preferably carried by it presses the lasting allowance of the upper materials upon the wipers as the cutter advances. Provision is made for varying the distance between the plane in which the cutter travels and the plane of the wipers and, when this distance corresponds to the thickness of the outer layer of the lasting allowance of the upper materials, the cutter, in advancing, will trim away the lasting allowance of the inner layers of the upper materials, that is, the lining, toe box and doubler, if present, but will leave intact the lasting allowance of the outer layer or upper proper.

Frequently there is an excess of material in the outer layer beyond what is required for the lasting allowance and it is desirable that this excess of material be removed. Accordingly, provision is made by the present invention for removing the excess of material in the outer layer of the upper materials. For this purpose, in the construction herein shown, a thin plate is mounted upon the wipers parallel thereto and spaced therefrom a distance slightly in excess of the thickness of the outer layer of the upper materials. One edge of the plate lies parallel with the edges of the wipers and is at a distance therefrom equal to the width of the lasting allowance required for the outer layer of the upper materials. With this construction, when the machine is operated as described, the excess of material in the lasting allowance of the outer layer will rest upon the plate, and the edge of the cutter, as it approaches the plate, will pass under it and thus trim off the excess of the lasting allowance of the outer layer.

During its cutting operation, the cutter preferably moves in a plane substantially parallel to the wipers. If, however, this plane of movement were maintained as the cutter is moved rearwardly of the shoe into inoperative position, the cutter would, under some conditions, contact with parts of the shoe not to be trimmed. Accordingly, it is desirable, as illustrated, to provide for a movement of the cutter away from the shoe bottom as it is moved toward the rear end of the shoe. As shown, this movement is afforded by mounting the arm which carries the cutter on an axis which, instead of being perpendicular to the plane of the wipers, is inclined at a slight angle thereto, the direction of its inclination being adjustable.

Another feature of the invention consists in cement-applying apparatus mounted for movement into and out of position over the toe end of the shoe and having means for causing cement to be deposited upon the shoe for holding the upper in lasted position. As illustrated, a receptacle is movable into position over the toe of the shoe in a plane above the shoe bottom and is depressible to cause it to engage the shoe bottom. The bottom of the receptacle is provided with holes in which plungers operate to cause dabs of cement to be deposited about the periphery of the insole. As illustrated, a handle is provided for operating the plungers, which handle is also utilized to swing the receptacle into position over the shoe and to depress it against the shoe bottom.

In another aspect the invention provides a novel method for use in the manufacture of shoes which comprises, for example, shaping the upper materials to conform to the shape of the toe of the last; then, while holding the upper materials to the last substantially in the plane of the bottom of the insole, turning the marginal portions of the upper materials outwardly of the shoe into a plane substantially parallel to the bottom of the insole and removing the marginal portions of the inner layers of the upper materials by utilizing a cutter traveling in a plane parallel to the plane of the inner face of the outer layer of the upper materials. The method also includes the removal of excess material from the lasting allowance of the outer layer by supporting it above the plane in which the main portion of the lasting allowance is supported so that the cutter will remove the excess of lasting allowance, leaving the main portion intact. Further steps of the method comprise the application of cement in predetermined relation to the periphery of the insole and the wiping of the lasting allowance of the outer layer of the upper materials over upon the insole to be secured by the cement.

These and other features and aspects of the invention will appear more fully from the following description when read in connection with the accompanying drawings and will be pointed out in the appended claims.

By use of the machine illustrated in the accompanying drawings the toe portion of upper materials, including the lining and toe box, may be shaped to the contour of a last and held against the last substantially at the edge of the shoe bottom, the lasting allowance or margin of the upper materials may be turned outwardly and so supported that a trimming knife moving in a predetermined plane will sever the lining and toe box along a line slightly above the plane of the shoe bottom and will sever the outer layer of the materials at a distance from the edge of the shoe bottom to provide the proper width of margin to overlie the insole; cement may be applied to the shoe bottom, and the upper then wiped into lasted position over the shoe bottom to be held by the cement.

Figures 1, 2, 3:
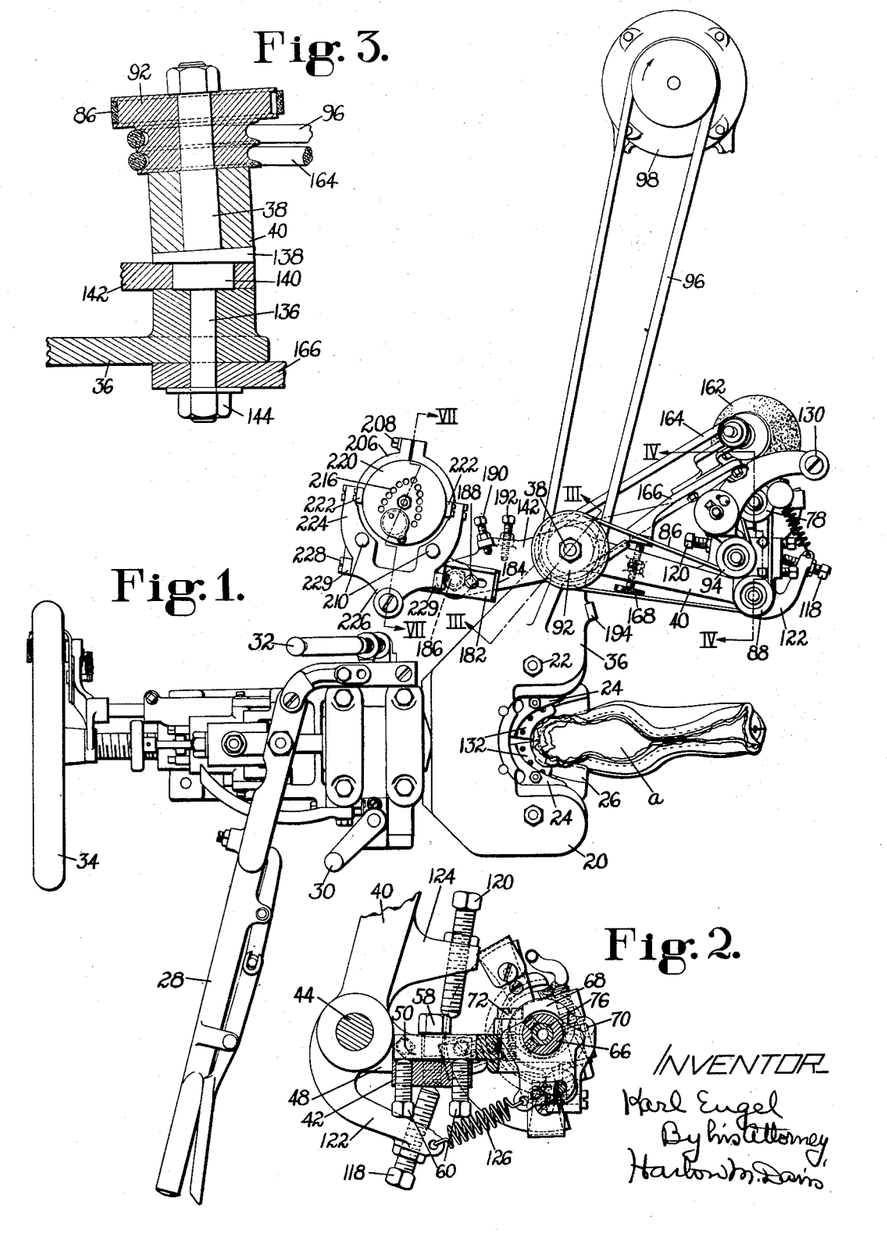
Fig. 1 is a plan view of a portion of a bed lasting machine equipped with mechanism embodying the present invention and adapted for use in the practice of the novel method.
Fig. 2 is a detail plan view of mechanism shown in Fig. 1, partly in section taken on the line II—II of Fig. 4.
Fig. 3 is a detail in vertical section taken on the line III—III of Fig. 1.

In Fig. 1 of the drawings is illustrated in plan view an organization embodying features of the present invention and by the use of which the above outlined method may be practiced. This figure illustrates the toe wiper head of a bed lasting machine having in general the organization disclosed in United States Letters Patent No. 1,018,477, granted February 27, 1912, upon an application filed in the name of Matthias Brock, to which reference may be had for a more detailed description of parts than is given herein.

The numeral 20 indicates a top plate secured by nuts 22 to a member in which wiper carriers 24 are mounted. End-embracing wipers 26 are mounted on the wiper carriers 24 and are operated to advance and close relatively to the shoe by means of a hand lever 28, as is usual. The angular relation of the plane of the wipers to the plane of the forepart of the shoe bottom may be varied as usual by means of cranks 30, 32, the lateral tipping of the wipers being controlled by the crank 32 and the longitudinal tilting of the wipers being controlled by the crank 30. The position of the wiper mechanism longitudinally of the shoe for different lengths of lasts is effected by turning a hand wheel 34.

Figure 4:
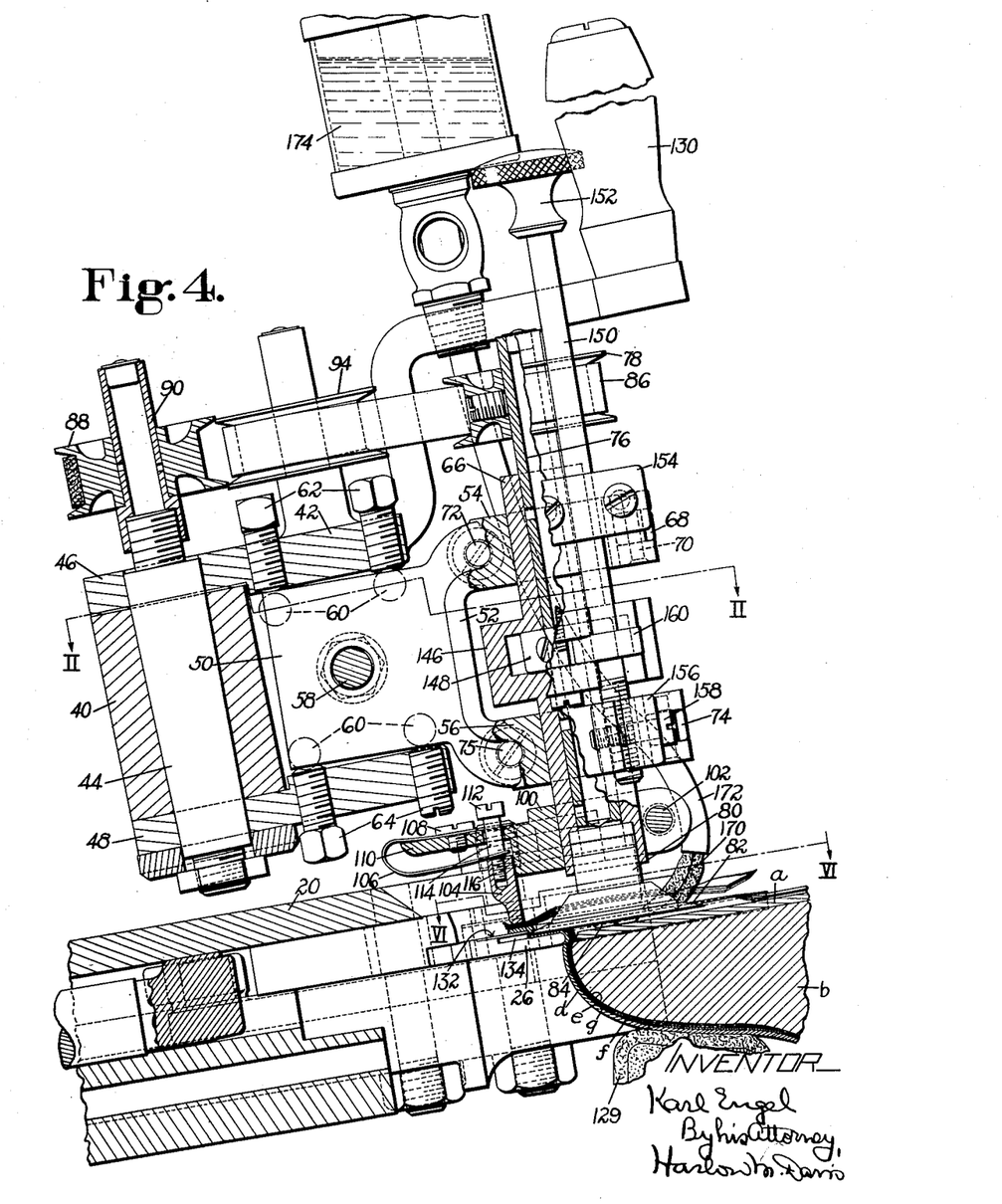
Fig. 4 is an enlarged elevation, with parts in section taken on the line IV—IV of Fig. 1.

In order to support mechanism embodying the present invention the cover plate 20 has a rearward extension 36 carrying by means hereinafter described an upwardly extending stud 38 upon which one end of a cutter arm 40 is mounted to swing. Near the other end of the arm a block 42 (Fig. 4) is pivotally mounted on the arm by a shaft 44 which extends through the arm and through ears 46, 48 formed on the block 42 and disposed, respectively, above and below the arm 40. In the rear face of the block 42 is a rectangular recess adapted to receive loosely the similarly shaped end 50 of a yoke member 52 which has vertically separated arms 54, 56. The portion 50 of the yoke member 52 is held in the recess in the block 42 by a cap screw 58 which passes loosely through a hole in the center of the portion 50 and is threaded into the block 42, as shown in Fig. 2. Four screws 60 are threaded through the block 42 to engage the rectangular portion 50, one of the screws being located adjacent to each of the four corners of the rectangular portion 50, as shown in Fig. 4. Two screws 62 are threaded through the portion of the block 42 which overhangs the upper edge of the rectangular portion 50 in position to engage the top edge face of the portion 50 near its opposite ends, that is, on opposite sides of the screw 58. Similarly, two screws 64 are threaded through the lower portion of the block 42 which underlies the lower edge face of the rectangular portion 50 in position to engage the edge face of that portion at points opposite the screws 62. It will be seen that by manipulation of the screws 62 and 64 the yoke member 52 may be adjusted about the screw 58 as a center in a vertical plane extending longitudinally of the shoe, and also that by manipulation of the four screws 60 the angular position of the yoke member with respect to the same vertical plane may be varied. The purpose of these adjustments will later appear. By setting up the screw 58, the yoke member 52 may be rigidly clamped to the block 42, the member and block forming a rigid arm movable about the shaft 44 as a pivot.

In each of the arms 54, 56 of the yoke member 52 is formed one half of the bearing or clamp for a fixed sleeve 66. The other half of the bearing for the sleeve 66 in the arm 54 is formed by a bearing cap 68 pivoted by a pin 70 to the arm 54 and held in position to engage the sleeve 66 by a screw 72 passing through the cap and threaded into the arm 54. A similar bearing cap 74 is similarly pivoted to the arm 56 and held in position by a similar screw 75. Within the sleeve 66 is rotatively mounted a sleeve shaft 76 which, at its upper end, extends above the sleeve 66 and has fixed thereto a pulley 78. The lower end of the sleeve shaft 76 has secured to it a cutter head 80 on which a disk cutter 82 is held by a screw 84. The pulley 78 on the shaft 76 is driven by a belt 86 which runs over an idler 88 rotatably mounted on a hollow stud 90 suitably secured to the upper end of the shaft 44, thence around a pulley 92 (Fig. 1) rotatably mounted on the upper end of the stud 38, then around an idler 94 mounted for rotation on a stud secured to the block 42, and thence back to the pulley 78. The pulley 92 is driven by a belt 96 leading to a suitable source of power, illustrated as an electric motor 98.

Figure 5:
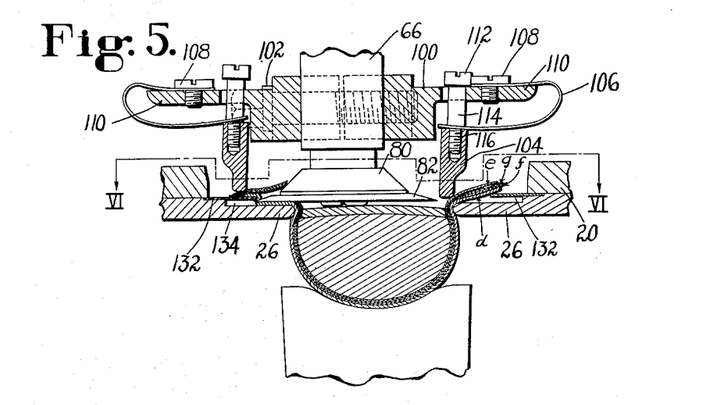
Fig. 5 is a sectional detail taken on the line V—V of Fig. 6, showing the operation of trimming the upper materials from a lasted shoe.

On the lower end of the sleeve 66 (Fig. 4) a member 100 is secured by a split bearing which can be tightened on the sleeve by a screw 102. On the member 100 is mounted means for engaging the upper materials in advance of the cutter 82, for laying them outwardly over the wipers 26 and for pressing them against the wipers during the advance of the cutter to trim the upper materials. This means comprises a substantially U-shaped member 104, illustrated in Figs. 4, 5, and 6, which is depressed against the upper by a number of U-shaped springs 106. These springs are shown as three in number and located one at the front of the member 104 and one at each side. One end of each spring is secured by a screw 108 to an outwardly extending flange 110 on the member 100 and the other end of the spring is secured to the presser member 104. For this purpose a screw 112 is provided which has an unthreaded portion 114 and a reduced threaded portion 116. The end of the spring is provided with a hole sufficiently large to receive the threaded portion 116 which is threaded into the top of the presser member 104 to hold that end of the spring. The unthreaded portion 114 of the screw passes through a hole in the flange 110 large enough to permit limited movement of the portion 114 of the screw but not large enough to permit passage of the head of the screw through it. The heads of the screws, therefore, limit the downward movement of the presser member 104 effected by the springs 106 and permit the member to move upwardly against resistance of the springs in response to pressure against it.

Swinging movement of the cutter arm, comprising the block 42 and the yoke member 52, about the shaft 44 is limited by means of two stop screws 118, 120 (Fig. 2), the screw 118 being threaded through an arm 122 formed as a forward extension of the arm 40 and the screw 120 being threaded through an extension 124 of the arm 40. These screws may be so set as to permit any desired swinging movement of the cutter 82 laterally of the shoe or, if desired, may be so set as to prevent such swinging movement, in which case the movement of the cutter would be due solely to the swinging movement of the arm 40 about the stud 38, that is, substantially longitudinally of the shoe. As illustrated, a spring 126 is connected between the arm 122 and a part of the mechanism which moves with the cutter to maintain the cutter swung outwardly to the limit determined by the stop screw 118.

Figure 6:
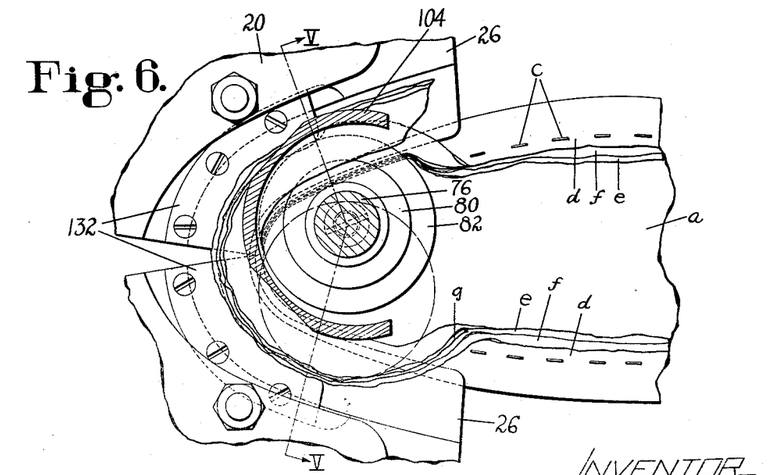
Fig. 6 is a detail plan view, partly in section, taken on the line VI—VI of Figs. 4 and 5.

The description has now advanced sufficiently far so that my novel method of trimming the toe portions of shoe uppers may be readily understood. Shoes upon which this operation is to be performed are usually side lasted, the upper materials at the sides of the shoe having been worked into lasted position over an insole $a$ upon a last $b$ and secured in lasted position by fastenings $c$ such as staples or in some other manner. A shoe in this condition is illustrated in Figs. 1 and 6. The shoe upper materials may comprise an outer layer $d$, usually of leather, and a number of layers of fabric, usually an inner layer $e$ called a lining and an intermediate layer $f$ called a doubler, with a toe box $g$ interposed either between the upper and the doubler or between the doubler and the lining. Thus, there may be at the toe portion of the shoe four layers of material the marginal portion of which it is necessary to dispose of in the toe-lasting operation. It is desirable, in work in which the upper is to be held in lasted position by cement, to remove substantially all the lasting allowance or margin of these layers except that of the outer layer; that is, the lasting allowance of the lining, doubler, if present, and toe box should be cut off in a plane just above the plane of the insole $a$.

A shoe in side-lasted condition is placed in a bed lasting machine equipped with the present invention with its forepart supported by a toe rest 129 and the end-embracing wipers 26 are employed in the usual manner to wipe the upper upwardly and shape it to the contour of the toe portion of the last, the upward movement of the wipers being arrested with the top face of the wipers in a plane parallel to but slightly above the plane of the insole. With the wipers thus holding the upper in lasted position against the edge corner of the last $b$, and/or against the edge face of the insole $a$, the cutter 82 is moved longitudinally of the shoe by means of a handle 130, whereby the arm 40 is swung about the stud 38, the edge of the cutter which is beveled on its top face being guided in the trimming operation in a plane substantially parallel to the plane of the wipers and insole and being located vertically above the plane of the top face of the wipers a distance substantially equal to the thickness of the outer layer $d$ of the shoe upper, the lasting allowance of which it is not desired to trim off. As the cutter 82 advances longitudinally of the shoe, the upwardly projecting lasting allowance of the various upper materials will first be engaged by the presser member 104 and pressed outwardly and downwardly against the top face of the wipers 26, and, when the cutter begins to advance over the edge of the wipers, the lining, doubler if any, and toe box will be trimmed off while the lasting allowance of the outer layer $d$ or upper proper will remain uncut in the space between the top face of the wipers 26 and the cutter 82. Under some conditions of work, for example on shoes with narrow toes, this single longitudinal movement of the cutter may be sufficient adequately to trim the upper materials, since the cutter, being circular, will trim the toe at the sides as well as at the end. In other work it may be desirable to permit a swinging movement of the cutter to extend the trimming operation at the sides of the toe. In this case the stop screws 118, 120 will be adjusted away from each other so as to permit the cutter to swing laterally of the shoe about the shaft 44. With this adjustment the cutter may be moved laterally of the toe to begin or extend the trimming operation at either side of the toe; for example, the cutter may be swung toward the front of the machine to trim one side of the toe, then moved to the left by swinging the arm 40 to trim the end of the toe, and then swung rearwardly to trim the rear side of the toe.

In some instances, where the lasting allowance of the outer layer of upper materials is particularly full, it may be desirable also to trim the outer layer but to leave thereon a predetermined width of lasting allowance. For this purpose there are provided on the wipers 26 thin plates 132 the inner edges of which are parallel to the wiping edges of the wipers but spaced outwardly therefrom a distance corresponding to the width desired for the lasting allowance of the outer layer. The plates 132 are secured at their outer margins to the wipers 26, but between their inner portions and the top face of the wipers is a space 134 (Fig. 4) which is greater heightwise of the shoe than the thickness of the outer layer of the upper materials. With this construction, if the extent of the lasting allowance of the outer layer is greater than the distance between the edges of the wipers and the edges of the plates 132, its outer portion will lie upon the plate 132, and, in the trimming operation, the edge of the cutter 82, since it acts in a plane below the plate 132, will engage the outer layer as it approaches the edge of the plate 132 and will sever the outer layer of the upper along a line corresponding to the inner edge of the plate 132, thus providing a lasting allowance of predetermined width upon the outer layer *d*. The presser 104, being yieldingly mounted and having a rounded forward edge will, as it advances, press the upper materials against the edges of the plates 132 and then ride up over the ridge of the upper materials thus formed and will still continue to press the upper on the plates 132 during the action of the cutter in severing the excess of the lasting allowance.

From Fig. 3 it will be seen that the stud 38 upon which the arm 40 carrying the cutter is mounted is held on the extension 36 by a depending stud 136 but that the longitudinal axis of the stud 38 is inclined to the longitudinal axis of the stud 136 at a small angle, illustrated as three or four degrees. The studs 38 and 136 are preferably integral, and there is also a flange 138 integral therewith and having an upper face perpendicular to the axis of the stud 38 and a lower face perpendicular to the axis of the stud 136. On the stud 136 beneath the flange 138 is a cylindrical enlargement 140 which fits an opening in an arm 142, to be later referred to, which arm is arranged to rotate about the enlargement 140. On the lower end of the stud 136 is a nut 144 by tightening which the stud 136 may be rigidly clamped to the wiper cover plate extension 36. It will be seen that the lower face of the flange 138 is parallel to the plane of the wipers 26 and that its upper face determines the plane in which the cutter 82 moves as the arm 40 is swung about the stud 38. Thus, the plane in which the cutter moves toward operating position and the plane of the wipers are not quite parallel. The stud 136 may be so adjusted, after loosening the nut 144, that the thinnest portion of the flange 138 and the axis of the stud 38 are in the same vertical plane with the arm 40 when the arm is swung into position to bring the cutter over the wipers where the cut is to be made, so that during the cut the cutter 82 will be at its lowest point and will move substantially in a plane parallel to the plane of the wipers, the cutter being so adjusted that its cutting edge will be substantially parallel to the plane of the wipers at this point. When the arm is swung backwardly toward its inoperative position it will, because of the inclination of the stud 38, move heightwise away from the shoe to avoid interference of the cutter with the ball portion of the shoe, and when it is swung toward the toe of the shoe it will approach the plane of the wipers. In the trimming operation the cutter will move substantially in the plane of the contacting surfaces of the outer layer of the upper materials and the layer that is adjacent thereto and will remove the lasting allowances of the inner layers, leaving the lasting allowance of the outer layer intact.

The relation of the plane of the cutter 82 to the plane of the wipers 26 may be varied by tipping the cutter laterally of the shoe through adjustment of the screws 60 which bear against one face of the rectangular portion 50 of the yoke member 52 and against which the member 50 is held by the screw 58, this adjustment being provided to permit the cutter to be so positioned with respect to the wipers that the cutting effect of the cutter upon one side of the shoe will be the same as that upon the other side notwithstanding the inclination of the stud 38. Also by adjusting the screws 62, 62 and 64, 64, the cutter may be tipped longitudinally of the shoe and wipers to position it in the desired relation to the plane of the wipers.

The low point of the flange 138 may be adjusted to various angular positions with respect to the axis of the stud 136, thus varying the point where in its movement over the shoe toe the cutter will reach its lowest position. This adjustment may be so made that the cutter, in its movement lengthwise of the shoe, will in the trimming operation still be descending and as it passes over the lasting allowance of the outer layer will tend to cut deeper, thus skiving off the lasting allowance of the outer layer and leaving less material to be gathered in when the lasting allowance is wiped over the shoe bottom into lasted position.

In order that the vertical position of the cutter 82 with relation to the wipers 26 may be established and varied with great accuracy if desired, a fine vertical adjustment for the cutter is provided. The sleeve 66 in which the cutter shaft 76 is mounted has midway of its length an enlargement 146 which is milled out to receive with a running fit a collar 148 secured to the cutter shaft 76, the collar, of course, preventing relative vertical movement between the shaft 76 and the sleeve 66. A rod 150 having a thumb head 152 is mounted parallel to the axis of the shaft 76 in a bearing 154, the lower end of the rod being threaded and received in a split clamp 156 which may be tightened on the threads of the rod by a screw 158. The rod carries a collar 160 which fits into a suitable notch formed in the enlargement 146 of the sleeve 66. It will be seen that after loosening the screws 72, 75 which hold the sleeve 66 in its bearings and loosening the screw 158, the sleeve 66 and hence the cutter shaft may be adjusted vertically by turning the rod 150 by its thumb head 152. Of course, after the proper vertical position of the cutter is secured, the screws 72, 75 and 158 are tightened.

After the cutter 82 has been manipulated by its handle 130 to effect the trimming of the upper in the manner described, the cutter head will be swung rearwardly of the machine out of the way to a position shown in Fig. 1 where the cutter 82 will be in close proximity to a grinder 162 driven by a belt 164 which runs from the grinder about a groove in the pulley 92 which is driven from the motor 98 by the belt 96. The grinder 162 is mounted on an arm 166 secured by the stud 136 (Fig. 3). On the arm 40 carrying the cutter 82 is an abutment screw 168 which engages the arm 166 and prevents undue movement of the cutter toward the grinder. By adjusting the screw 168, the desired amount of contact between the grinder and the cutter may be permitted.

In trimming some upper materials, such, for instance, as have a toe box impregnated with tarry or gummy substances, it is desirable to keep the trimming knife 82 clean and prevent the tarry or gummy material from sticking to it. For this purpose a wick 170 is arranged to engage the marginal portion of the cutter 82. The wick 170 extends upwardly through a tube 172 to the upper end of which is secured a cup 174 containing a liquid solvent for the tarry or gummy material in the toe box. When the toe box is impregnated with a tarry thermoplastic material in common use, kerosene oil acts effectively as a solvent to be fed by the wick 170 to the cutter.

After the upper has been trimmed and prior to wiping the trimmed lasting allowance thereof over the bottom of the insole, it is desirable to apply cement to the insole so that the upper will be secured in lasted position to the insole. For this purpose the apparatus shown in Figs. 1, 7, 8 and 9 is provided which comprises a cement-containing receptacle 180 which has a filling opening 181 with a cover 183 and is mounted, in a manner to be described, on a member 182 arranged to slide longitudinally of a member 184 which is pivoted by a bolt 186 to the previously-mentioned arm 142 carried by the stud 136. The member 182 carrying the receptacle is slotted to receive a cap screw 188, the adjustment thus provided enabling the receptacle to be adjusted laterally of the shoe when in operative position so that it may be centralized with respect to the toe portion of the insole. The pivot 186 enables the receptacle to be swung relatively to the arm 142 to pass obstructions, and, when swung in a counter-clockwise direction as shown in Fig. 1, the member 184 engages an adjustable abutment screw 190 on the arm 142 which limits its movement in that direction. When the arm 142 is also swung in a counterclockwise direction, so that an abutment screw 192 on the arm engages an abutment 194 on the extension 36, the receptacle will be located over the toe portion of the insole. In order to bring the receptacle into this position, it must be swung in a plane above the insole and, after it has reached its position over the insole, it must be lowered to bring it substantially into contact with the insole. For this purpose two guide rods 196 are each secured by a screw 198 in an ear 200 formed on the member 182. The lower ends of the rods 196 pass freely through holes in a block 202 secured by screws 204 to the receptacle 180. A clamp ring 206 is secured about the upper part of the receptacle by means of a clamp screw 208 and in the ring are carried two thimbles 210 into which the upper ends of the rods 196 enter. Between the upper ends of the rods and the closed upper ends of the thimbles are springs 212 upon which the weight of the receptacle 180 rests. Therefore, by downward pressure on the ring 206 the receptacle may be pushed down into contact with the shoe by compression of the springs 212, this position of the receptacle being illustrated in Fig. 7.

In the bottom 214 of the receptacle is a series of holes 215 arranged to follow the periphery of the toe portion of an insole. Each of the holes 215 has a small cylindrical portion, a conical portion and a larger cylindrical portion, the holes being formed to receive the similarly shaped lower ends of rods 216 which slide vertically through holes in a cover portion 218 of the receptacle and are secured at their upper ends in a block 220. By raising the block 220 the lower ends of all of the rods 216 may be lifted out of the holes 215 in the bottom of the receptacle so as to permit the flow of cement from the receptacle to the holes. Thus to lift the rods the block 220 is connected at each side by a link 222 to one of the arms 224 of a yoke member 226 which is pivoted at 228 to ears 229 upstanding from the ring 206. An extension of the yoke 226 beyond the pivot 228 carries a handle 230 by use of which the operator may swing the receptacle into position over the shoe, depress it against the springs 212 until the receptacle rests against the insole, and then, by tipping the handle so as to turn the yoke about the pivot 228, may lift the rods 216 to permit cement to pass through the holes 215, the movement of the yoke thus to lift the rods being limited by an adjusting screw 232 threaded through the ring 206 in position to engage the yoke 226 when tipped. To prevent the yoke from tipping too easily or accidentally, a spring 234 is mounted between the head 220 and a nut 235 on a rod 236 which passes loosely through the block 220 down through the cover 218 of the receptacle and is threaded into the bottom thereof. The yoke 226 is, of course, tipped only momentarily by the handle 230 and then released to allow the spring 234 to react and force the rods 216 back into the holes 215, thus expelling the cement which has flowed into the holes while the rods 216 were raised. In this way a series of small dabs of cement are deposited on the insole substantially as shown at 238 in Fig. 9.

Figures 7, 8, 9:
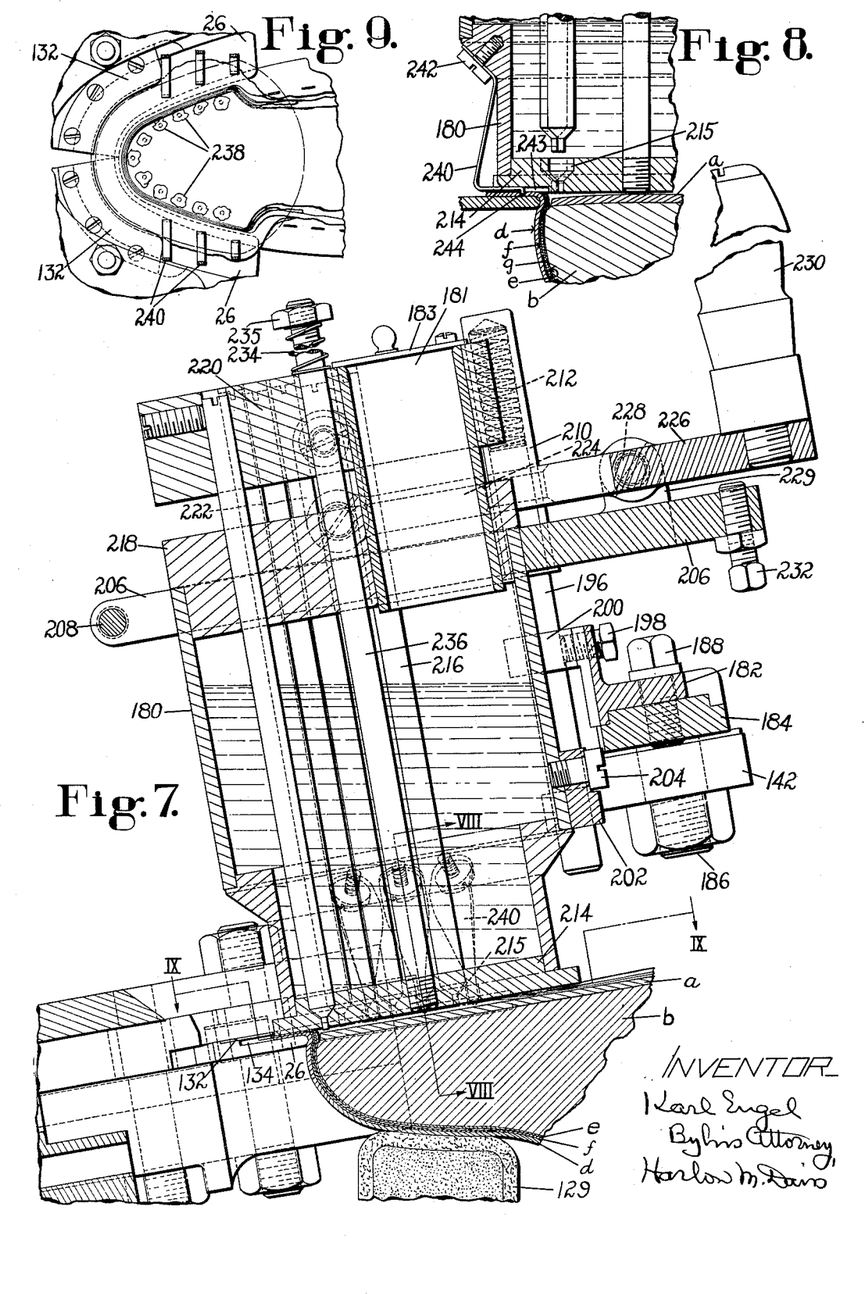
Fig. 7 is an enlarged vertical section taken on the line VII—VII of Fig. 1, illustrating the cement-applying device and its location with respect to the shoe bottom when it is in operative position.
Fig. 8 is a sectional detail taken on the line VIII—VIII of Fig. 7 transversely of the shoe.
Fig. 9 is a detail in plan, partly in section taken on the line IX—IX of Fig. 7.

Preferably the upper is wiped in position over the insole while the receptacle is in cement-applying position and, in order to assist in the lasting of the upper and the wiping of the upper over the insole, the cement receptacle 180 is provided with retarders 240 which engage the lasting allowance of the upper and serve to increase the tension applied by the wipers to the upper during the overwiping operation. The retarders 240 are in the form of a series of spring members which, as shown in Fig. 8, are secured at 242 to the receptacle 180 and have their lower end portions extended in under the bottom of the receptacle in which there are grooves 243 to receive them. The inner ends of the members 240 are turned downwardly to form tangs 244 which serve to give them a grip upon the lasting allowance of the upper. As shown in Fig. 8, the vertical portion of each retarder 240 extends outwardly away from the receptacle so that the tanged end can move inwardly with the wipers a substantial distance, the spring tension thus applied to the retarder tending to draw the upper outwardly over the wipers. At the toe end the bottom 214 of the receptacle itself acts as a retarder, the downward pressure of which upon the upper is controlled by the operator, the receptacle being lifted by the wipers as they pass under it. After the wipers have advanced well over the bottom of the insole, the receptacle is allowed to be raised by the springs 212 and is swung out of the way, as illustrated in Fig. 1. The wiping of the upper will be continued and as it continues the dabs of cement 238 will be spread and coalesced into a single layer between the lasting allowance and the insole. The wipers will be allowed to remain in contact with the overlasted upper for a sufficient time to insure that the cement will be set sufficiently to hold the upper in lasted position, which time, of course, depends upon the nature of the cement being used.

Having described my invention, what I claim as new and desire to secure by Letters Patent of the United States is:

1. In a lasting machine, means for holding the marginal portion of the toe end of upper materials outspread, and a cutter movable in such relation to said holding means as to sever from the upper materials the marginal portion of less than the total number of layers of the materials.

2. In a lasting machine, the combination of toe-embracing members over which upper materials may be outspread, means for spreading the marginal portion of the toe end of the upper materials outwardly over said toe-embracing members, and a cutter movable over and above the top face of the members in such relation to the toe-embracing members as to sever from the upper materials the marginal portion of less than the total number of layers of the materials.

3. In a lasting machine, the combination of toe-embracing means over which layers of a multi-ply upper may be outspread, a power-driven cutter for trimming the margin of the toe end of an upper, an arm mounted for swinging movement to carry said cutter lengthwise of the shoe into operating position in a plane parallel to the outspread upper, and a support for the cutter pivotally mounted on said arm for swinging movements laterally of the shoe in said plane.

4. In a machine for removing surplus upper stock from the toes of shoes, the combination of a power-driven element, and a trimmer operatively connected with said power-driven element and supported independently of the shoe for bodily movement in a predetermined plane to trim the toe of an upper positioned in cooperative relation to said trimmer.

5. In a machine for operating upon the uppers of shoes, the combination of a shoe support, a power-driven shaft, and a trimmer arranged to be driven by said shaft, said shaft and trimmer being supported independently of the shoe and arranged for manually effected movement over the toe portion of the sole of a supported shoe in a predetermined path.

6. In means for removing surplus upper stock from the toes of shoes, the combination of means to support a shoe to be trimmed, and a power-operated upper trimmer supported for manually effected movement independently of the shoe in a predetermined plane substantially parallel to the plane of the forepart of the bottom of the shoe.

7. In means for removing surplus upper stock from the toes of shoes, the combination of means to support the toe of a shoe to be trimmed, a power-operated trimmer supported for manually effected movement longitudinally and transversely of the forepart of the shoe, and means independent of the shoe for confining movement of said trimmer to a plane substantially parallel to the plane of the forepart of the shoe sole.

8. In a machine for trimming the uppers of shoes, the combination of a flat support for a shoe upper, a power-driven element, and a rotatable trimming tool arranged to be operated by said power-driven element and supported and arranged for manually effected movement independently of the shoe confined to a plane substantially parallel to the plane of the upper support.

9. In a machine for trimming shoe uppers, the combination of means for supporting a shoe and engaging the marginal portion of its upper to support said portion in a plane substantially parallel to the bottom of the insole, and a rotary cutter constructed and arranged to move in a predetermined plane substantially parallel to the supported upper materials and separated from said first-named plane a distance substantially equal to the thickness of the layer of upper material next to the support.

10. In means for operating on the toes of shoes, the combination of means to hold the upper materials against the last and form a flat support therefor before laying them inwardly over the last bottom, a rotary cutter and means to drive it, said cutter being constructed and arranged to move independently of the shoe in a predetermined plane substantially parallel to the flat support and acting when so moved to trim the upper materials progressively around the toe while they are so held.

11. In means for operating on the toes of shoes, the combination of end-embracing members arranged to support the upper in lasted position over the toe of a last, and a cutter mounted for movement in a predetermined plane independently of the shoe in cooperative relation to the top face of the members to trim away the inner layers of the the upper materials while leaving a lasting allowance of the outer layer untrimmed.

12. In a machine for operating upon the uppers of shoes, the combination of a flat support for a shoe upper, a power-driven element, a rotatable trimming tool arranged to be operated by said power-driven element and supported and arranged for manually effected movement in a plane substantially parallel to the plane of the upper support, and means for adjusting said tool heightwise of said support.

13. In a last machine, the combination of toe-embracing members, a support for said members adjustable to tip the members and thereby position them in proper relation to the toe ends of different shoes, and a cutter carried by said adjustable support for trimming the marginal portion of the toe end of the shoe upper materials, said cutter being operatively movable in a plane arranged in predetermined relation to the plane of the toe-embracing members to trim the upper materials in outspread position over the said members in any adjusted position of the support.

14. In upper-trimming means, a cutter movable to trim the marginal portion of the toe end of upper materials including a toe box, and means for applying to said cutter a solvent for material in said toe box.

15. In means for operating on the toes of shoes, the combination of toe-embracing members constructed and arranged to support the upper against the last about the toe portion thereof, and trimming means mounted for movement independently of the shoe in a predetermined plane substantially parallel to the top face of the members to trim stock from the portion of the upper materials yet to be brought into lasted position.

16. In means for operating on the toes of shoes, the combination of members arranged to hold the upper in lasted position about the toe of a last and against the sides thereof, a cutter movable to cooperate with the top face of the members to trim away the inner layers of the upper materials outspread upon them while leaving the lasting allowance of the outer layer untrimmed, and means for laying the upper materials outwardly upon the members in conjunction with the action of the cutter.

17. In means for operating on the toes of shoes, the combination with means to hold the toe portion of the upper materials against the last and to support the lasting allowance thereof in outturned position, of a rotary cutter movable in a plane substantially parallel to the outturned lasting allowance and arranged to trim away the lasting allowance of the lining and toe box while leaving the outer layer of the upper substantially intact.

18. In a lasting machine, the combination of toe-embracing members, a power-driven cutter confined to operative movement in a plane substantially parallel to the plane of the members with its cutting edge spaced from the outer face of the members a distance less than the combined thickness of the several layers of upper materials for severing the marginal portion of less than the total number of layers of the materials, and means movable to spread the marginal portion of the upper materials outwardly over the members in advance of the cutter.

19. In means for operating on the toes of shoes, the combination with means to support a shoe and to hold the upper materials at the toe portion of the shoe against the sides of the last up to the plane of the outer face of the insole and to support the marginal portion of the upper materials in a plane substantially parallel to the plane of the outer face of the insole, of a rotary cutter movable over the toe portion of the shoe in a plane substantially parallel to the insole, and a member movable with the cutter for pressing the outturned lasting allowance of the upper materials against its support, the plane of the acting edge of said cutter being disposed heightwise of the shoe so as to coincide substantially with the contacting surface of the outer layer of the upper materials with the layer next to it.

20. In means for operating on the toes of shoes, the combination with means to hold the toe portion of the upper materials against the last and to support the lasting allowance thereof in outturned position, of a rotary cutter movable in a plane substantially parallel to the outturned lasting allowance, spaced from said support a distance substantially equal to the thickness of the outer layer of the upper materials, and acting to trim away the lasting allowance of the lining and toe box while leaving the outer layer of the upper intact.

21. In means for operating on the toes of shoes, the combination with means to support a shoe and to hold the upper materials at the toe portion of the shoe against the sides of the last up to the plane of the outer face of the insole and to support the lasting allowance of the upper materials in a plane substantially parallel to the plane of the outer face of the insole, of a rotary cutter movable over the toe portion of the shoe in a plane substantially parallel to the insole, and a U-shaped member yieldingly carried by the cutter and acting to press the outturned lasting allowance of the upper materials against their support, the plane of the acting edge of said cutter being disposed heightwise of the shoe so as to coincide substantially with the contacting surfaces of two of the layers of the upper materials.

22. In means for removing surplus upper stock from the toes of shoes, the combination with means to position a shoe and to support in outturned position the lasting allowance of the upper materials about the toe portion of the shoe, of a rotary disk cutter constructed and arranged to be moved by the hand of the operator around the toe of the shoe and guided for such movement in a plane substantially parallel to the plane of the outturned lasting allowance, and means normally extending beyond the forward portion of the edge of the cutter to insure that the lasting allowance will be pressed against its support prior to the action of the cutter thereon.

23. In means for removing surplus upper stock from the toes of shoes, the combination of an upwardly extending shaft, a disk cutter mounted on the lower end of said shaft to be driven thereby, a sleeve embracing the shaft, means for effecting a fine adjustment of the sleeve longitudinally to vary the position of the cutter, and means for guiding the cutter in a plane substantially perpendicular to the shaft, said cutter being bodily movable in that plane.

24. In means for removing surplus upper stock from the toes of shoes, the combination with means to support a shoe with the plane of the bottom of its forepart substantially horizontal, of means to support the lasting allowance of the upper materials in outturned position in a plane substantially parallel to the bottom of the forepart, a disk cutter rotatably driven about an axis substantially perpendicular to the bottom of the forepart, means for preventing bodily movement of said cutter except in a plane substantially parallel to the bottom of the forepart, and means for adjusting the cutter longitudinally of its axis so that when moved in its own plane it will trim away the uppermost layers of the lasting allowance leaving intact the lowermost layer.

25. In means for removing surplus upper stock from the toes of shoes, the combination of means for supporting the lasting allowance of a shoe upper in a plane with its inner layer uppermost, a shaft substantially perpendicular to the lasting allowance so supported, a disk cutter rotatably driven about the axis of said shaft, means for mounting the cutter to confine movement thereof to a plane substantially parallel to the lasting allowance and coinciding with the upper surface of the lower layer of the lasting allowance, and a handle by which the cutter may be moved in said plane to cause it to remove the upper layers of the lasting allowance.

26. In means for removing surplus upper stock from the toes of shoes, the combination of means for supporting the lasting allowance of upper materials about the toe of a shoe in outturned position and substantially in a plane parallel to the plane of the last bottom, and a rotary disk cutter mounted for movement longitudinally and transversely of the forepart of the shoe with the plane of the disk parallel to the outturned lasting allowance, the cutter mounting being so constructed and arranged that when the cutter is in operative position with relation to the lasting allowance it will trim away the uppermost layers only thereof and when moved toward the heel end of the shoe will be carried away from the shoe bottom so as to avoid interference of the cutter with parts of the shoe not to be trimmed.

27. In a machine for trimming shoe uppers, the combination of a shoe support, end-embracing members for supporting the upper materials about the toe portion of a last, means for turning the lasting allowance of the upper materials outwardly over the end-embracing members and pressing it in contact therewith, and a rotary disk cutter movable independently of the shoe over the toe portion of the last in a predetermined plane, said plane coinciding substantially with adjacent surfaces of layers of the lasting allowance.

28. In a machine for operating on shoe uppers, the combination of a shoe support, end-embracing members for supporting the upper materials about the toe portion of an insole upon a last, means for turning the lasting allowance of the upper materials outwardly over the end-embracing members and pressing it in contact therewith, means carried by the end-embracing members for supporting any excess of the lasting allowance in a plane spaced from the end-embracing members, and a rotary disk cutter movable out of contact with the insole and last over the toe portion of the last in a predetermined plane, said plane coinciding substantially with adjacent surfaces of layers of the lasting allowance, whereby movement of the cutter in said plane will remove the lasting allowance of the upper materials except the layer next to the end-embracing members and will remove the excess of lasting allowance of that layer also.

29. In a lasting machine, a cutter movable in a predetermined plane to trim the toe end of upper materials, and means for positioning the marginal portion of the upper materials in such relation to said plane as to cause the cutter to cut through less than the total number of layers of the materials at a predetermined distance from the edge of the materials and to cut through the remaining layer or layers in a location nearer said edge.

30. In a lasting machine, the combination with toe-embracing members, of means for laying the marginal portion of the toe end of upper materials outwardly over said members, a cutter movable in such a path as to sever from the upper materials along a line near the edges of said members the marginal portion of less than the total number of layers of the materials, and means for positioning in the path of the cutter farther outwardly from the edges of said members the remaining layer or layers.

31. In a machine for operating on shoe uppers, the combination of a shoe support, end-embracing members for supporting the upper materials about the toe portion of a last, means for turning the lasting allowance of the upper materials outwardly over the end-embracing members and pressing it in contact therewith, means carried by the end-embracing members for supporting any excess of lasting allowance in a plane above said members, and a rotary disk cutter movable over the toe portion of the last in a predetermined plane, located beneath the surface of the support for the excess of lasting allowance to remove the excess of lasting allowance of the upper materials.

32. In means for removing surplus upper stock from the toe portions of shoes, the combination with means for supporting a shoe, means for supporting the lasting allowance of the toe portion of the upper materials in outturned relation in a plane substantially parallel to the shoe bottom, and means for supporting the excess of the lasting allowance in a plane parallel to but spaced from the plane of the support for the lasting allowance, of a rotary disk cutter mounted for movement in a predetermined plane located between the plane of the surface of the support for the lasting allowance and the plane of the surface of the support for the excess of the lasting allowance whereby through movement of the cutter the lasting allowance of the lining and toe box will be trimmed close to the edge of the last bottom and the excess of lasting allowance of the materials will be trimmed farther from the edge of the last bottom.

33. In means for removing surplus upper stock from the toe portions of shoes, the combination with means for supporting a shoe bottom upward, means for supporting the lasting allowance of the toe portion of the upper materials in outturned relation in a plane substantially parallel to the shoe bottom, and means for supporting the excess of the lasting allowance in a plane parallel to but spaced from the plane of the support for the lasting allowance, of a rotary disk cutter mounted for movement in a predetermined plane located below the plane of the supporting surface of the support for the excess of the lasting allowance whereby through movement of the cutter in said plane the excess of lasting allowance will be trimmed from the lasting allowance of the upper materials.

34. In a machine for operating on shoe uppers, the combination of a shoe support, end-embracing members for supporting the upper materials about the toe portion of a last, means for turning the lasting allowance of the upper materials outwardly over the end-embracing members and pressing it in contact therewith, means carried by the end-embracing members for supporting any excess of the lasting allowance in a plane above said members, and a rotary disk cutter movable over the toe portion of the last in a predetermined plane such as to cause the cutter to remove the excess of lasting allowance of the upper materials.

35. In a lasting machine, the combination with toe-embracing wipers for wiping the marginal portion of an upper inwardly over an insole, of a cement-applying device movable into position to apply cement to the shoe for securing the upper to the insole, said cement-applying device having means thereon for holding the marginal portion of the upper outturned over the wipers as the wipers are moved inwardly over the insole.

36. In a lasting machine, the combination with toe-embracing wipers for wiping the marginal portion of an upper inwardly over an insole, of a cement-applying device movable into position to apply cement to the shoe for securing the upper to the insole, said cement-applying device having thereon a plurality of yieldable members for holding the marginal portion of the upper outturned over the wipers as the wipers are moved inwardly over the insole.

37. In a lasting machine, the combination with toe-embracing wipers for wiping the marginal portion of an upper inwardly over an insole, of a cement-applying device movable into position to apply cement to the shoe for securing the upper to the insole, said cement-applying device having thereon a plurality of members arranged to hold the marginal portion of the upper outturned over the wipers as the wipers are moved inwardly over the insole and provided with projections for gripping the upper, said members being yieldable to permit their upper-engaging portions to be carried inwardly by the pull of the upper thereon.

38. In a machine for operating upon the toe portions of shoes, the combination of a shoe support, end-embracing wipers movable heightwise of a shoe thereon to wipe the upper into lasted relation to the toe end of the last, a cement receptacle mounted for movement in a predetermined plane substantially parallel to the shoe bottom into a position over the toe portion of the insole, means permitting movement of the receptacle heightwise of the shoe to bring the bottom of the receptacle into contact with the insole, means for discharging cement from the receptacle onto the portion of the insole over which the upper is to be lasted, means for operating the wipers to wipe the upper over the cemented portion of the insole, and means carried by the receptacle for retarding movement of the lasting allowance of the upper during the inward movement of the wipers.

39. In a machine for operating on the toes of shoes, the combination with means to support a shoe having an insole with the plane of the bottom of its forepart substantially horizontal, and means to support the lasting allowance of the upper materials in outturned position in a plane substantially parallel to the bottom of the forepart, of a disk cutter rotatably driven about an axis substantially perpendicular to the bottom of the forepart, means for preventing bodily movement of said cutter except in a plane substantially parallel to the forepart, means for moving the cutter in its own plane to trim away the uppermost layers of the lasting allowance leaving the lowermost layer, and means for operating the support for the lasting allowance to wipe the lasting allowance of the lowermost layer over the insole into contact therewith.

40. In a machine for operating upon shoes, the combination of means for working an upper into lasted position about the periphery of a last having an insole thereon, means guided for movement in predetermined relation to the insole for applying dabs of cement about the periphery of the toe portion of the insole, and means for wiping the lasting allowance of the outer layer of the upper into contact with the insole to be secured thereto by the cement.

41. In a machine for operating upon shoe toes, the combination of end-embracing wipers for working the toe portion of upper materials into engagement with the toe portion of a last, a support for the wipers, and means for applying cement to the insole, said means being carried by said support and being movable into a predetermined position with relation to the insole, the wipers being thereafter operative to wipe the lasting allowance into contact with the shoe bottom to be secured by the cement.

42. In a machine for operating upon the toe portions of shoes, the combination of a shoe support, end-embracing wipers movable heightwise of said support to wipe an upper into lasted relation to the toe end of a last having an insole thereon, a cement receptacle mounted for movement into a position over the toe portion of the insole, means for discharging cement from the receptacle onto the portion of the insole over which the upper is to be lasted, means for operating the wipers to wipe the upper over the cement coated portion of the insole, and means carried by the receptacle for retarding movement of the margin of the upper during the inward movement of the wipers.

43. In a machine for operating upon shoes, the combination of means for working an upper into lasted position about the periphery of an insole on a last, means for applying cement to the toe portion of the insole in predetermined relation to the margin thereof, and means for wiping the lasting allowance of the outer layer of the upper materials into contact with the insole to be secured thereto by the cement.

44. In a machine for operating upon the toe portions of shoes, the combination of a shoe support, end-embracing wipers movable heightwise of said support to wipe an upper into lasted relation to the toe end of a last having an insole thereon, a cement receptacle mounted for movement into a position over the toe portion of the insole, means for discharging cement from the receptacle onto the portion of the insole over which the upper is to be lasted, means for operating the wipers to wipe the upper over the cement coated portion of the insole, and means carried by the receptacle for retarding movement of the lasting allowance of the upper during the inward movement of the wipers.

45. A machine for operating upon shoes having, in combination, a support over which the marginal portion of the upper materials may be laid in a flat condition, a power-driven cutter movable substantially parallel to said support and spaced therefrom a distance equal to the thickness of the outer layer of the upper materials to sever from the toe end of said upper materials the marginal portion of the lining and toe box while leaving the marginal portion of the outer layer of the materials to be thereafter lasted over the insole, said upper support being movable over the insole to lay the outer layer of the upper materials against the insole.

46. A machine for operating upon shoes having, in combination, end-embracing wipers, and a cement-applying device mounted for movement in a plane parallel to the wipers from an idle position to a predetermined position over the toe end of the shoe bottom and movable heightwise of the shoe for applying cement to the margin of the toe portion of the insole, said wipers being thereafter movable over the insole to wipe the outer layer of the upper materials against the cemented portion of the insole.

47. A machine for operating upon the toe portions of shoes having, in combination, a support for holding a shoe bottom up, end-embracing wipers, a support for the wipers angularly adjustable to bring the plane of the wipers parallel to the plane of the forepart of the insole of the shoe, and a cement-applying device mounted upon said support for movement in a plane parallel to the wipers from an inoperative position into a predetermined position over the toe end of the insole and also for heightwise movement to apply cement to the marginal portion of the insole for securing the upper materials in lasted position, said wipers being thereafter operable to wipe the upper into contact with the cemented portion of the insole.

48. That improvement in methods for use in the manufacture of shoes which comprises working upper materials including an outer layer and inner layers about the toe portion of a last, holding the upper materials in engagement with the last about the edge thereof, turning the lasting allowance of the upper materials outwardly, and while supporting the lasting allowance in a plane moving a cutting edge in a plane substantially parallel to said plane to sever the inner layers of the lasting allowance without affecting the outer layer.

49. That improvement in methods for use in the manufacture of shoes which comprises shaping upper materials comprising an outer layer and inner layers to the toe portion of a last, holding the upper materials against the last about the periphery of the last bottom, turning the marginal portions of the upper materials outwardly into a substantially flat condition, and moving a cutting edge in a plane spaced from the outer surface of the outer layer a distance substantially equal to the thickness of the outer layer to sever the marginal portions of the inner layers.

50. That improvement in methods for use in the manufacture of shoes which comprises shaping upper materials including an outer layer and an inner layer to the toe portion of a last, holding the upper materials in engagement with the last about the edge thereof, turning the lasting allowances of the upper materials outwardly, and while supporting them in a plane moving a cutting edge in a plane coinciding substantially with the surfaces of contact between the outer and inner layers to sever the inner layer.

51. That improvement in methods for use in the manufacture of shoes which comprises working upper materials comprising an outer layer and inner layers into lasted relation to the toe portion of a last, utilizing end-embracing wipers to hold the upper materials against the last substantially in the plane of the last bottom, turning the marginal portions of the upper materials outwardly against the top surface of the wipers, and moving a cutting edge in a plane parallel to the top surface of the wipers and in a path following the curve of the edges of the wipers and spaced from said surface a distance equal to the thickness of the outer layer progressively to sever the marginal portions of the inner layers.

52. That improvement in methods for use in the manufacture of shoes which comprises working upper materials including an outer layer and inner layers over the toe portion of a last, holding the upper in engagement with the last about the edge thereof, turning the lasting allowances of the upper materials outwardly, and while supporting them in a plane substantially parallel to the plane of the last bottom utilizing a cutter acting in a plane coinciding with the surfaces of contact between the outer layer and the next inner layer to sever the lasting allowances of the inner layers from the upper materials.

53. That improvement in methods for use in the manufacture of shoes which comprises working upper materials including an outer layer and inner layers over the toe portion of a last, turning the lasting allowances of the upper materials outwardly, and while supporting them in two planes substantially parallel to the plane of the last bottom utilizing a cutter acting in a plane between said two planes to sever the lasting allowances of the inner layers on a line adjacent to the edge of the last bottom and to sever the excess of the lasting allowance of the outer layer at a distance from the edge of the last bottom.

54. That improvement in methods for use in the manufacture of shoes which comprises working upper materials including an outer layer, a lining and a toe box over the toe portion of a last, holding the upper materials in engagement with the last about the edge thereof, turning the lasting allowances of the upper materials outwardly, and, while supporting them in a plane substantially parallel to the plane of the last bottom, moving a cutting edge in a plane coinciding with the surfaces of contact between the outer layer and the toe box to sever the lasting allowances of the lining and toe box.

55. That improvement in methods for use in the manufacture of shoes which comprises working upper materials comprising an outer layer, a toe box and a lining into lasted relation to the toe portion of a last, utilizing end-embracing wipers to hold the upper materials against the last substantially in the plane of the last bottom, turning the marginal portions of the upper materials outwardly against the top surface of the wipers, moving a cutting edge in a plane parallel to the top surface of the wipers and spaced therefrom a distance substantially equal to the thickness of the outer layer, thereby severing the marginal portions of the lining and toe box, and utilizing the end-embracing wipers to wipe the outer layer over the bottom of the last.

56. That improvement in methods for use in the manufacture of shoes which comprises working upper materials comprising an outer layer and inner layers into lasted relation to the toe portion of a last having an insole thereon, utilizing end-embracing wipers to hold the upper materials against the last substantially in the plane of the bottom of the insole, turning the marginal portions of the upper materials outwardly against the top surface of the wipers, moving a cutting edge in a plane parallel to the top surface of the wipers and spaced therefrom a distance substantially equal to the thickness of the outer layer, thereby separating the marginal portions of the inner layers from the upper materials, applying cement to the insole, and utilizing end-embracing wipers to wipe the upper over the bottom of the insole.

57. That improvement in methods for use in the manufacture of shoes which comprises assembling upon a last an insole and upper materials including an outer layer and inner layers, shaping the upper materials to conform them to the shape of the toe of the last, and while holding the upper materials to the last substantially in the plane of the insole turning the marginal portions of the upper materials outwardly into a plane substantially parallel to the bottom of the insole, removing the marginal portions of the inner layers, applying cement to the insole, laying the marginal portion of the outer layer over upon the insole, and maintaining pressure thereon until the cement has set.

58. That improvement in methods for use in the manufacture of shoes which comprises assembling upon a last an insole and upper materials including an outer layer and inner layers, shaping the upper materials to conform to the shape of the toe of the last, holding the upper materials to the last about the periphery thereof, turning the marginal portions of the upper materials outwardly, supporting said outturned portions in a plane, removing the marginal portions of the inner layers by moving a cutter so that its edge operates in the plane of contact of the outer layer with the next inner layer, applying cement to the insole, and laying the marginal portion of the outer layer over upon the insole.

59. That improvement in methods for use in the manufacture of shoes which comprises assembling upon a last an insole and upper materials including an outer layer, a toe box and a lining, shaping the upper materials to conform to the shape of the toe of the last, holding the upper materials to the last substantially in the plane of the last bottom, turning the marginal portions of the upper materials outwardly, supporting said turned out portions in a plane substantially parallel to the last bottom, removing the marginal portions of the box and lining by moving a cutter so that its edge operates in the plane of the contacting surfaces of the outer layer and toe box, applying cement to the insole, and laying the marginal portion of the outer layer over upon the insole and maintaining pressure thereon until the cement has set.

60. In a lasting machine, the combination with toe-embracing wipers for wiping the marginal portion of an upper inwardly over an insole, of a cement receptacle movable into position over the insole and having openings in its bottom through which cement may be applied to the insole, said receptacle being so mounted that it may be manually depressed to cause the bottom thereof to serve as a retarder for pressing the upper against the wipers during operation of the wipers in wiping the upper over the insole.

61. In a lasting machine, the combination with toe-embracing wipers for wiping the marginal portion of an upper inwardly over an insole, of a cement receptacle movable into position over the insole and having openings in its bottom through which cement may be applied to the insole, plungers for closing said openings, and means for depressing the receptacle to cause the bottom thereof to engage the insole, said means being connected to the plungers for operating them.

62. In a lasting machine, the combination with toe-embracing wipers for wiping the marginal portion of an upper inwardly over an insole, of a cement receptacle yieldingly mounted for movement toward the insole and movable into position over the insole and having openings in its bottom through which cement may be applied to the insole, plungers normally closing said opening, a handle by which the receptacle may be manually moved into position and depressed to cause the bottom thereof to engage the insole, and connections from said handle to the plungers to cause them to be operated by movement of the handle.

63. In a lasting machine, the combination with toe-embracing wipers for wiping the marginal portion of an upper inwardly over an insole, of a cement receptacle movable from an out-of-the-way position into position over the insole and movable also toward the insole, said receptacle having openings in its bottom through which cement may be applied to the insole, plungers for closing the openings in the bottom of the receptacle, a handle mounted on the receptacle for rocking movement, and connections from the handle to the plungers so that rocking movement of the handle will raise the plungers, said handle being also utilized for moving the receptacle over the shoe bottom and toward the insole.

KARL ENGEL.